United States Patent
Xie et al.

(10) Patent No.: US 12,234,316 B2
(45) Date of Patent: Feb. 25, 2025

(54) ACRYLATE OLIGOMER AND PREPARATION METHOD AND APPLICATION METHOD THEREOF

(71) Applicant: ZHEJIANG UNIVERSITY, Hangzhou (CN)

(72) Inventors: Tao Xie, Hangzhou (CN); Jingjun Wu, Hangzhou (CN); Qian Zhao, Hangzhou (CN); Jiada Chen, Hangzhou (CN)

(73) Assignee: Zhejiang University, Hangzhou (CN)

( * ) Notice: Subject to any disclaimer, the term of this patent is extended or adjusted under 35 U.S.C. 154(b) by 380 days.

(21) Appl. No.: 17/722,371

(22) Filed: Apr. 17, 2022

(65) Prior Publication Data
US 2022/0403095 A1 Dec. 22, 2022

(30) Foreign Application Priority Data
Jun. 1, 2021 (CN) .......................... 202110608425.0

(51) Int. Cl.
| C08F 2/46 | (2006.01) |
| C08F 2/50 | (2006.01) |
| C08G 18/10 | (2006.01) |
| C08G 18/67 | (2006.01) |
| C08G 61/04 | (2006.01) |

(52) U.S. Cl.
CPC ........... *C08G 18/673* (2013.01); *C08G 18/10* (2013.01)

(58) Field of Classification Search
CPC .... C08G 18/5024; C08G 18/73; C08G 18/10; C08G 18/246; C08G 18/672; C08G 18/4854; C08G 18/755; C08G 18/673; C08G 18/48

USPC ...................................... 522/93, 90, 1; 520/1
See application file for complete search history.

(56) References Cited

U.S. PATENT DOCUMENTS

2019/0161573 A1* 5/2019 Okada .................. C08G 18/244

FOREIGN PATENT DOCUMENTS

| CN | 110486730 | 11/2019 |
| CN | 113072678 | 7/2021 |

OTHER PUBLICATIONS

Tassel et al, A new blocking agent of isocyanates, 2000, European Polymer Journal, 36, 1745-1751 (Year: 2000).*

* cited by examiner

*Primary Examiner* — Jessica Whiteley

(57) ABSTRACT

The present invention discloses an acrylate oligomer, the acrylate oligomer is obtained by a reaction of isocyanate group-terminated oligomer and formate-terminated ethylene glycol methacrylate. After the acrylate oligomer provided by the present invention is photocured, the molecular structure, cross-linking density and other network structure characteristics of the acrylate oligomer can be changed through specific post-processing. Since the formate component formed after heat treatment has no water absorption and has a low glass transition temperature, the final material obtained after heat treatment has a lower water absorption rate and glass transition temperature. The present invention also provides a preparation method and an application method of the acrylate oligomer.

6 Claims, No Drawings

ACRYLATE OLIGOMER AND PREPARATION METHOD AND APPLICATION METHOD THEREOF

This application claims priority to Chinese Patent Application No. 202110608425.0 filed Jun. 1, 2021, which is hereby incorporated by reference.

FIELD OF TECHNOLOGY

The present invention belongs to a field of photocurable oligomers, and particularly relates to an acrylate oligomer and a preparation method and application method thereof.

BACKGROUND TECHNOLOGY

Photocuring is a process in which light is used as an energy source to rapidly transform a liquid substance with photoreactivity into a solid state. Light curing technology has the characteristics of high efficiency, wide adaptability, economy, energy saving and environmental protection. Light curing technology is also used in coatings, inks, adhesives, photoresists, 3D printing and other fields.

The photocuring system is mainly composed of oligomer, reactive diluent and photoinitiator, wherein the properties of oligomer determine the properties after curing, such as hardness and toughness. Usually, photocuring forms a very stable non-melting and insoluble three-dimensional polymer network structure, also known as thermosetting polymer. In order to ensure a high curing speed, the polymer formed by photocuring usually has a high cross-linking density, resulting in poor mechanical properties, specifically brittleness and poor toughness.

The Chinese Patent Publication No. 201910790012.1 discloses a polyurethane acrylate oligomer, the molecular structure contains a dis sociable large sterically hindered urethane bond. After the urethane acrylate oligomer is photocured, the large sterically hindered urethane bond will dissociate, and the exposed isocyanate groups will react with water vapor, resulting in changes in the molecular structure of the material, crosslink density and other network structure characteristics, and ultimately changes in the mechanical properties of the material.

The Chinese Patent Publication No. 202110198554.7 discloses a polyurea acrylate oligomer, which also contains dissociable bulky sterically hindered amine ester bonds. After the polyurea acrylate oligomer is photocured, the bulky sterically hindered amine ester bonds will dissociate, and the isocyanate group generated in the system will react with the urea bond in the system (no water vapor is required), which will change the molecular structure and mechanical properties. The above two patents both introduce a large sterically hindered urethane bond into the molecular structure, and use its dissociation property at a certain temperature to cause changes in the network structure and performance. After the dissociation of the large sterically hindered urethane bond, an amino group will be generated, which will make the system hygroscopic. In addition, the amino group-containing components in the system after the rearrangement of the network structure have a higher glass transition temperature (greater than 45° C.), the glass transition temperature of the system cannot be lowered, and the low-temperature elasticity of the material will be poor.

Therefore, if another dis sociable group and structure different from the bulky urethane bond could be introduced, the above problem would be solved.

SUMMARY OF THE INVENTION

The object of the present invention is to provide an acrylate oligomer, its molecular structure, cross-linking density and other network structure characteristics can be changed through specific post-processing after photocuring, so that its thermal and mechanical properties can also be adjusted by post-processing. The present invention also provides a preparation method of the acrylate oligomer and an application method in a preparation of a photocurable polymer.

The object of the present invention is realized by following technical route.

An acrylate oligomer is obtained by a reaction of isocyanate group-terminated oligomer and formate-terminated ethylene glycol methacrylate:

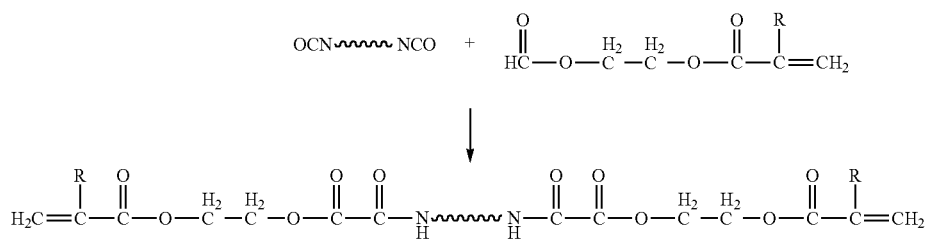

Wherein R is hydrogen or methyl.

In the above-mentioned oligomer, a urethane-ester bond is formed by the reaction of isocyanate and formate. This chemical bond is an unstable chemical bond, which will dissociate and regenerate isocyanate and formate under heating conditions. The generated isocyanate can be cured by water vapor to form polyurea or react with urea bonds in the system to form biuret, thereby changing the network structure and material properties. Since the formate component formed after heat treatment has no water absorption and has a low glass transition temperature, the final material obtained after heat treatment has a lower water absorption rate and glass transition temperature (the Tg of the formate-terminated ethylene glycol methacrylate is about 20° C.).

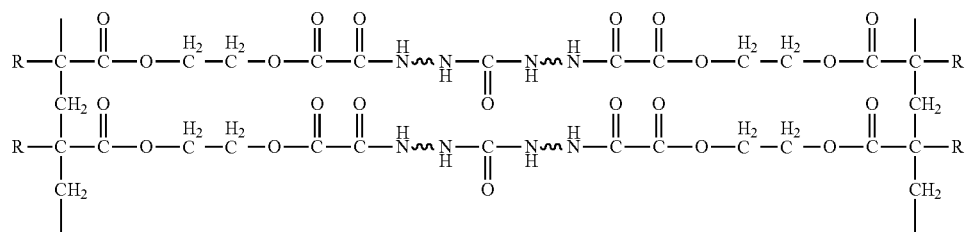
↓ Heating
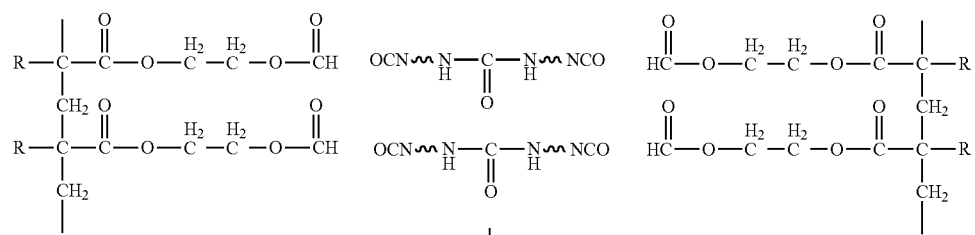
↓ Heating
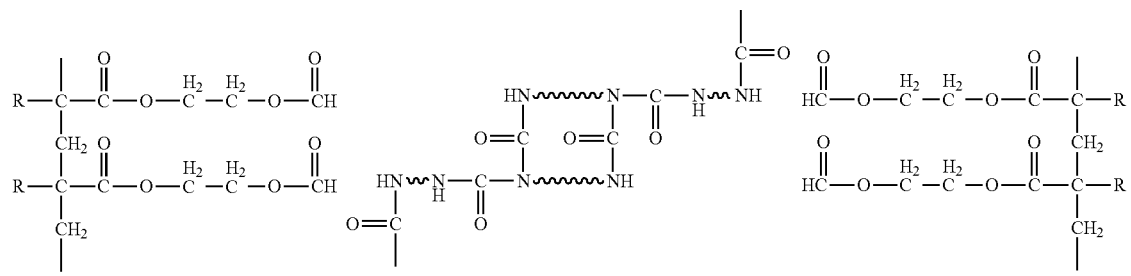
or
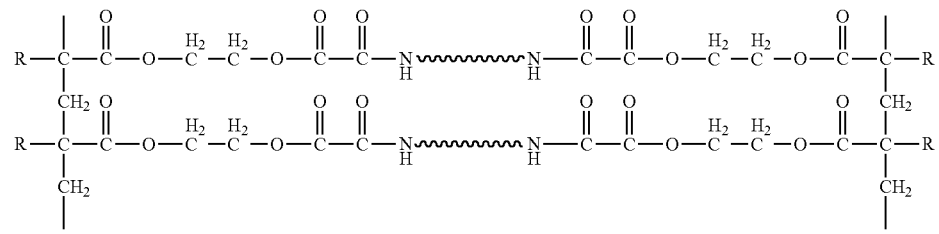
↓ Heating
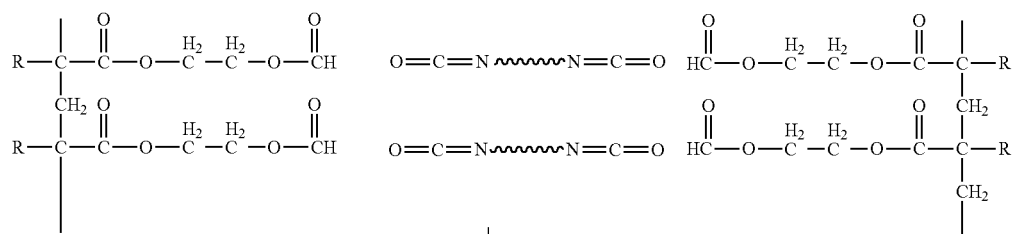
↓ Water, Heating

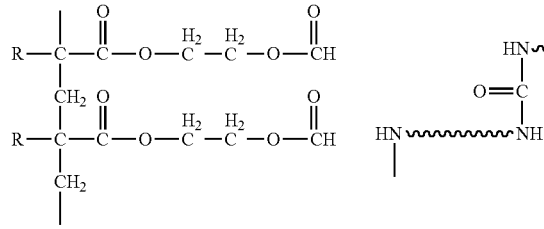 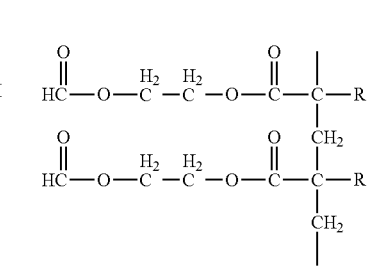

The acrylate oligomer provided in the present invention is obtained by reacting an isocyanate group-terminated oligomer with formate-terminated ethylene glycol methacrylate. The isocyanate group-terminated oligomer is obtained by reacting an isocyanate-containing compound with an active hydrogen-containing compound, and the molar ratio of isocyanate to active hydrogen is greater than 1.

The active hydrogen-containing compound can be selected from one or more of polyols or polyamines.

Preferably, the polyol is selected from one or more of polyester polyol, polyether polyol, polycarbonate polyol, polybutadiene polyol, polyolefin polyol or polyacrylate polyol.

Preferably, the polyamine is selected from one or more of polyetheramine, dichlorodiaminodiphenylmethane, and diethyltoluenediamine.

The isocyanate-containing compound is selected from one or more of toluene diisocyanate, diphenylmethane diisocyanate, hexamethylene diisocyanate, isophorone diisocyanate, xylylene diisocyanate, and dicyclohexylmethane diisocyanate.

The present invention also provides a method for the above-mentioned acrylate oligomer, comprising the steps:

1) adding the polyol or polyamine or the composition of polyol and polyamine dropwise into the isocyanate-containing compound at 40-60° C., and titrating the reaction end point with di-n-butylamine to obtain an isocyanate group-terminated oligomer.

2) adding dropwise isocyanate group-terminated oligomer into formate-terminated ethylene glycol methacrylate, reacting at 60° C., and titrating the isocyanate content in the system with di-n-butylamine to 0 to obtain the acrylate oligomer.

In step 1), the polyol is selected from one or more of polyester polyol, polyether polyol, polycarbonate polyol, polybutadiene polyol, polyolefin polyol or polyacrylate polyol. The polyamine is selected from one or more of polyetheramine, dichlorodiaminodiphenylmethane and diethyltoluenediamine.

In step 1), the isocyanate-containing compound is selected from one or more of toluene diisocyanate, diphenylmethane diisocyanate, hexamethylene diisocyanate, isophorone diisocyanate, xylylene diisocyanate, and dicyclohexylmethane diisocyanate.

The present invention also proposes an application method of the acrylate oligomer in the preparation of light-cured polyacrylate, and the application method comprises the following steps:

1) mixing the acrylate oligomer with a reactive diluent and add an initiator to obtain a mixture;
2) using a light source matching the initiator to cure the mixture in step 1) to obtain a light-cured sample;
3) if the acrylate oligomer does not contain urea bonds, placing the light-cured sample obtained in step 2) at a temperature of 60-100° C. and a humidity of 60-90% for 1-48 hours; if the acrylate oligomer contains urea bonds, the light-cured sample obtained in step 2) is treated at a temperature of 60-100° C. for 1-48 hours.

Compared with the prior art, the present invention has the beneficial effects that the crosslinking density of the light-cured polymer is reduced after post-treatment, and a polyurea structure is formed at the same time, both of which are beneficial to improve the toughness of the polymer. In addition, the dissociated formate structure in the present invention does not absorb water, and the glass transition temperature is low, which is beneficial to the preparation of an elastomer with low water absorption rate and low temperature performance.

DETAILED DESCRIPTION OF THE EMBODIMENTS

The content of the present invention will be further described below in conjunction with specific embodiments. The following embodiments are not a simple limitation of the essential spirit of the present invention, and any simple changes or equivalent replacements made based on the essential spirit of the present invention shall fall within the scope of the claimed protection of the present invention.

Example 1

1) 2 mol hexamethylene diisocyanate (HDI, Mw=168) was added to a reactor equipped with mechanical stirring paddle, thermometer, condenser and constant pressure funnel, and the temperature was 40° C. 1 mol polytetrahydrofuran ether glycol (PTMG, Mw=1000) was dropped through the constant pressure funnel, the temperature was controlled to be lower than 60° C., and the completion of the reaction was confirmed by the n-butylamine method to obtain an isocyanate group-terminated oligomer.

2) 2 mol formate-terminated ethylene glycol methacrylate was added dropwise to the above intermediate product, 7 g of dibutyltin dilaurate (DBTDL) was added after the dropwise addition was completed, the temperature was raised to 50° C. and the reaction was continued for 3 hours. When the NCO value was 0 confirmed through the n-butylamine method, the reaction was completed, and an acrylate oligomer was obtained.

Taking 5 g of the above-mentioned acrylate oligomer, adding 0.15 g of photoinitiator 819, and the light source was a high-pressure mercury lamp. ASTM D412-compliant splines were cast in clear molds to test uniaxial tensile properties. The above-mentioned splines were post-treated in a constant temperature and humidity box with a temperature of 110° C. and a humidity of 75% for 16 hours to test the uniaxial tensile properties. The elongation at break before treatment was 42%, and the breaking strength was 5 MPa; after treatment, the elongation at break was 200%, and the breaking strength was 10 MPa.

Example 2

1) 2 mol hexamethylene diisocyanate (HDI, Mw=168) was added to a reactor equipped with mechanical stirring paddle, thermometer, condenser and constant pressure funnel. 1 mol polyetheramine(D2000, Mw=2000) was dropped through the constant pressure funnel, the temperature was controlled to be lower than 40° C., and the completion of the reaction was confirmed by the n-butylamine method to obtain an isocyanate group-terminated oligomer.

2) 2 mol formate-terminated ethylene glycol methacrylate was added dropwise to the above intermediate product, 7 g of dibutyltin dilaurate (DBTDL) was added after the dropwise addition was completed, the reaction was continued for 3 hours at room temperature. When the NCO value was 0 confirmed through the n-butylamine method, the reaction was completed, and an acrylate oligomer was obtained.

5 g of the above-mentioned acrylate oligomer was provided, 0.15 g of photoinitiator 819 was added, and the light source was a high-pressure mercury lamp. ASTM D412-compliant splines were cast in clear molds to test uniaxial tensile properties. The above-mentioned splines were post-treated in oven at 110° C. for 10 hours to test the uniaxial tensile properties. The elongation at break before treatment was 50%, and the breaking strength was 2.3 MPa; after treatment, the elongation at break was 350%, and the breaking strength was 4.5 MPa.

Example 3

1) 2 mol isophorone diisocyanate (IPDI, Mw=222) was added to a reactor equipped with mechanical stirring paddle, thermometer, condenser and constant pressure funnel, and the temperature was 40° C. 1 mol polytetrahydrofuran ether glycol (PTMG, Mw=1000) was dropped through the constant pressure funnel, the temperature was controlled to be lower than 60° C., and the completion of the reaction was confirmed by the n-butylamine method to obtain an isocyanate group-terminated oligomer.

2) 2 mol formate-terminated ethylene glycol methacrylate was added dropwise to the above intermediate product, 7 g of dibutyltin dilaurate (DBTDL) was added after the dropwise addition was completed, the temperature was raised to 50° C. and the reaction was continued for 3 hours. When the NCO value was 0 confirmed through the n-butylamine method, the reaction was completed, and an acrylate oligomer was obtained.

5 g of the above-mentioned acrylate oligomer was provided, 0.15 g of photoinitiator 819 was added, and the light source was a high-pressure mercury lamp. ASTM D412-compliant splines were cast in clear molds to test uniaxial tensile properties. The above-mentioned splines were post-treated in a constant temperature and humidity box with a temperature of 90° C. and a humidity of 75% for 10 hours to test the uniaxial tensile properties. The elongation at break before treatment was 38%, and the breaking strength was 3.2 MPa; after treatment, the elongation at break was 400%, and the breaking strength was 3.8 MPa.

Example 4

1) 2 mol hexamethylene diisocyanate (HDI, Mw=168) was added to a reactor equipped with mechanical stirring paddle, thermometer, condenser and constant pressure funnel, and the temperature was 40° C. 1 mol polytetrahydrofuran ether glycol (PTMG, Mw=1000) was dropped through the constant pressure funnel, the temperature was controlled to be lower than 60° C., and the reaction was completed when the NCO value was confirmed to be 6.28 by the n-butylamine method, an isocyanate group-terminated oligomer was obtained.

2) 2 mol formate-terminated ethylene glycol methacrylate was added dropwise to the above intermediate product, 7 g of dibutyltin dilaurate (DBTDL) was added after the dropwise addition was completed, the temperature was raised to 50° C. and the reaction was continued for 3 hours.

When the NCO value was 0 confirmed through the n-butylamine method, the reaction was completed, and an acrylate oligomer was obtained.

5 g of the above-mentioned acrylate oligomer was provided, 0.15 g of photoinitiator 819 was added, and the light source was a high-pressure mercury lamp. ASTM D412-compliant splines were cast in clear molds to test uniaxial tensile properties. The above-mentioned splines were post-treated in oven at 90° C. for 10 hours to test the uniaxial tensile properties. The elongation at break before treatment was 56%, and the breaking strength was 4.3 MPa; after treatment, the elongation at break was 250%, and the breaking strength was 6 MPa.

The invention claimed is:

1. A method of preparing light-cured polyacrylate from an acrylate oligomer, wherein, the acrylate oligomer is obtained by a reaction of isocyanate group-terminated oligomer and formate-terminated ethylene glycol methacrylate:

wherein R is methyl;
the isocyanate group-terminated oligomer is obtained by reacting an isocyanate-containing compound with an active hydrogen-containing compound, and the molar ratio of isocyanate to active hydrogen is greater than 1;
the active hydrogen-containing compound can be selected from one or more of polyols or polyamines;
the polyol is selected from one or more of polyester polyol, polyether polyol, polycarbonate polyol, polybutadiene polyol, polyolefin polyol or polyacrylate polyol; the polyamine is selected from one or more of polyetheramine, dichlorodiaminodiphenylmethane, and diethyltoluenediamine;

the isocyanate-containing compound is selected from one or more of toluene diisocyanate, diphenylmethane diisocyanate, hexamethylene diisocyanate, isophorone diisocyanate, xylylene diisocyanate, and dicyclohexylmethane diisocyanate;

wherein, the method comprises the following steps:
1) mixing the acrylate oligomer with a reactive diluent and adding an initiator to obtain a mixture;
2) using a light source matching the initiator to cure the mixture in step 1) to obtain a light-cured sample; and
3) if the acrylate oligomer does not contain urea bonds, placing the light-cured sample obtained in step 2) at a temperature of 60-100° C. and a humidity of 60-90% for 1-48 hours; if the acrylate oligomer contains urea bonds, treating the light-cured sample obtained in step 2) at a temperature of 60-100° C. for 1-48 hours.

2. The method of claim 1, comprising the steps:
1) adding the polyol or polyamine or the composition of polyol and polyamine dropwise into the isocyanate-containing compound at 40-60° C., and titrating the reaction end point with di-n-butylamine to obtain an isocyanate group-terminated oligomer,
2) adding dropwise isocyanate group-terminated oligomer into formate-terminated ethylene glycol methacrylate, reacting at 60° C., and titrating the isocyanate content in the system with di-n-butylamine to 0 to obtain the acrylate oligomer.

3. The method of claim 2, wherein, the polyol is selected from one or more of polyester polyol, polyether polyol, polycarbonate polyol, polyolefin polyol or polyacrylate polyol; the polyamine is selected from one or more of polyetheramine, dichlorodiaminodiphenylmethane, and diethyltoluenediamine.

4. The method of claim 2, wherein, in the step (1), the isocyanate-containing compound is selected from one or more of toluene diisocyanate, diphenylmethane diisocyanate, hexamethylene diisocyanate, isophorone diisocyanate, xylylene diisocyanate, and dicyclohexylmethane diisocyanate.

5. The method of claim 1, wherein, the polyol is polybutadiene polyol.

6. The method of claim 2, wherein, the polyol is polybutadiene polyol.

* * * * *